United States Patent
Wheatley et al.

(10) Patent No.: US 11,366,257 B2
(45) Date of Patent: Jun. 21, 2022

(54) OPTICAL FILTERS COMPLEMENTARY ANGULAR BLOCKING REGIONS

(71) Applicant: 3M INNOVATIVE PROPERTIES COMPANY, St. Paul, MN (US)

(72) Inventors: John A. Wheatley, Stillwater, MN (US); Guanglei Du, Painted Post, NY (US); Gilles J. Benoit, Minneapolis, MN (US); Rolf W. Biernath, Wyoming, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 429 days.

(21) Appl. No.: 16/341,639

(22) PCT Filed: Oct. 18, 2017

(86) PCT No.: PCT/US2017/057191
§ 371 (c)(1),
(2) Date: Apr. 12, 2019

(87) PCT Pub. No.: WO2018/075640
PCT Pub. Date: Apr. 26, 2018

(65) Prior Publication Data
US 2019/0377114 A1 Dec. 12, 2019

Related U.S. Application Data

(60) Provisional application No. 62/409,680, filed on Oct. 18, 2016.

(51) Int. Cl.
*G02B 5/28* (2006.01)
*G02B 5/00* (2006.01)
(Continued)

(52) U.S. Cl.
CPC ............... *G02B 5/28* (2013.01); *G02B 5/003* (2013.01); *G02B 5/045* (2013.01); *G02B 5/208* (2013.01); *G02B 2207/123* (2013.01)

(58) Field of Classification Search
CPC .......... G02B 5/28; G02B 5/003; G02B 5/045; G02B 5/208; G02B 2207/123; G02B 5/20; G01J 2003/1213
See application file for complete search history.

(56) References Cited

U.S. PATENT DOCUMENTS 6,531,230 B1 * 3/2003 Weber .................... B32B 27/08
428/480
2002/0112384 A1 8/2002 Huang
(Continued)

FOREIGN PATENT DOCUMENTS

| CN | 1054319 | 9/1991 |
| JP | 2011-220770 | 11/2011 |

(Continued)

OTHER PUBLICATIONS

International Search report for PCT International Application No. PCT/US2017/057191 dated Jan. 29, 2018, 6 pages.

*Primary Examiner* — Kimberly N. Kakalec
(74) *Attorney, Agent, or Firm* — Jonathan L. Tolstedt

(57) ABSTRACT

An example optical filter may include an angle blocking layer Slaving a first angular light blocking range $\theta_{AL}$ relative to a normal axis, and an interference filter adjacent the angle blocking layer having a second angular light blocking range $\theta_{IF}$ relative to the normal axis. $\theta_{IF}$ and $\theta_{AL}$ at least partially overlap. The example optical filter has a predetermined light transmission zone comprising angles from 0° to a maximum light transmission angle $\theta_{Tmax}$ relative to a normal axis of the major surface. The example optical filter has a predetermined angular light blocking zone $\theta_B$, a union of $\theta_{IF}$ and $\theta_{AL}$. An example optical filter may include an interference (Continued)

filter having an incidence angle-dependent reflection band and an absorbing layer having an absorption band. The incidence angle-dependent reflection band and the absorption band may overlap at least one wavelength at least one angle of incidence.

11 Claims, 14 Drawing Sheets

(51) Int. Cl.
  *G02B 5/04* (2006.01)
  *G02B 5/20* (2006.01)

(56) References Cited

U.S. PATENT DOCUMENTS

| | | |
|---|---|---|
| 2008/0291541 A1 | 11/2008 | Padiyath |
| 2009/0080075 A1 | 3/2009 | Ho |
| 2012/0236313 A1 | 9/2012 | Nakamura |
| 2013/0135750 A1 | 5/2013 | Walker, Jr. |
| 2014/0051955 A1 | 2/2014 | Tiao |
| 2014/0126183 A1 | 5/2014 | Geng |
| 2015/0002809 A1 | 1/2015 | Cohen-Tannoudji |
| 2015/0009563 A1 | 1/2015 | Lauters |

FOREIGN PATENT DOCUMENTS

| | | |
|---|---|---|
| JP | 2011-221376 | 11/2011 |
| WO | 2006-110401 | 10/2006 |
| WO | 2013-084178 | 6/2013 |

\* cited by examiner

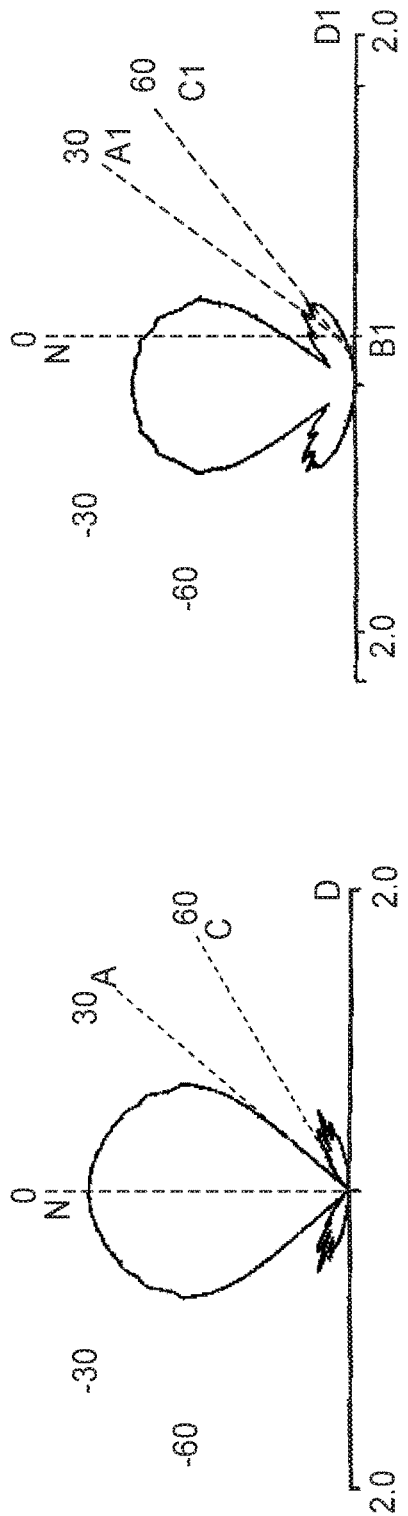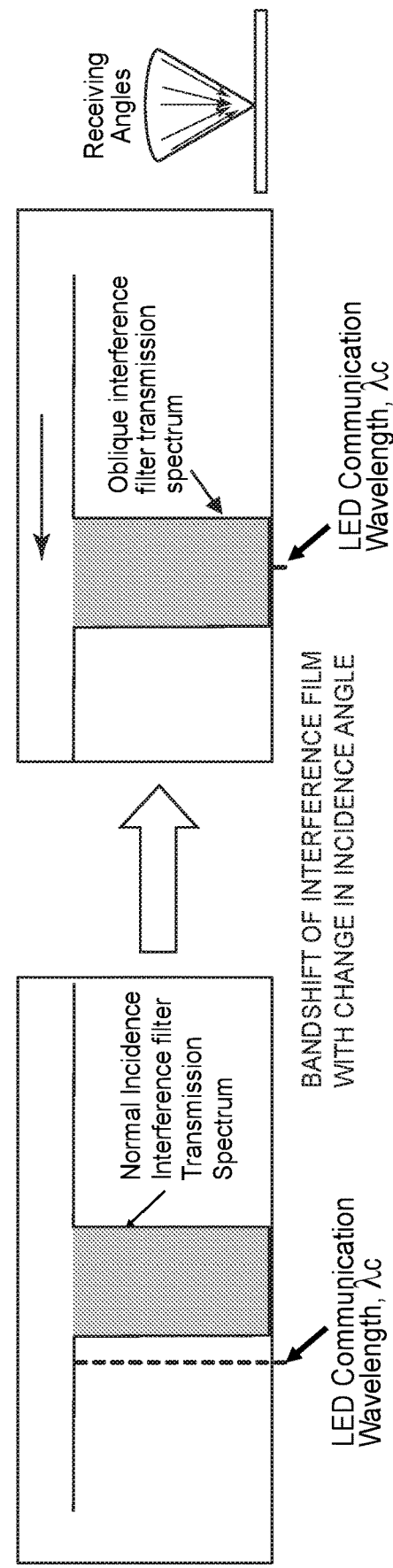

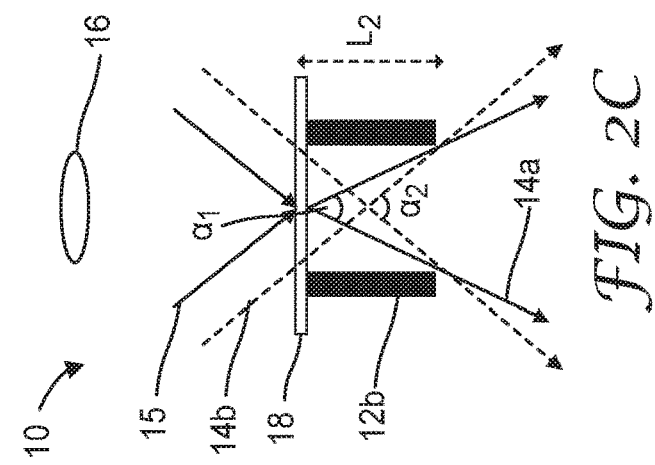
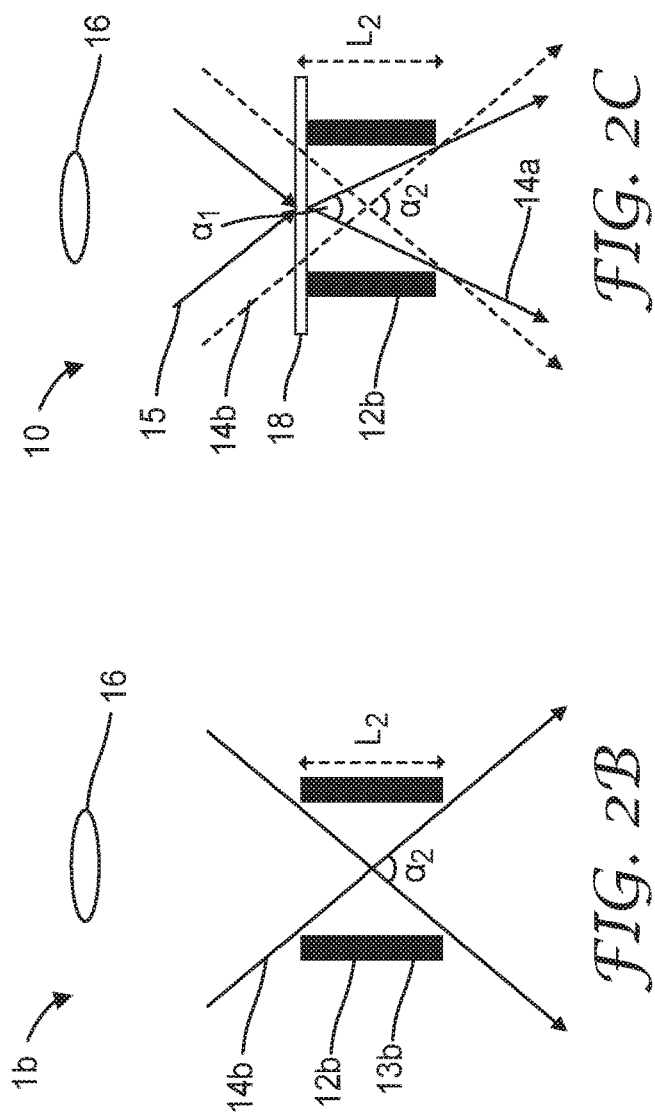
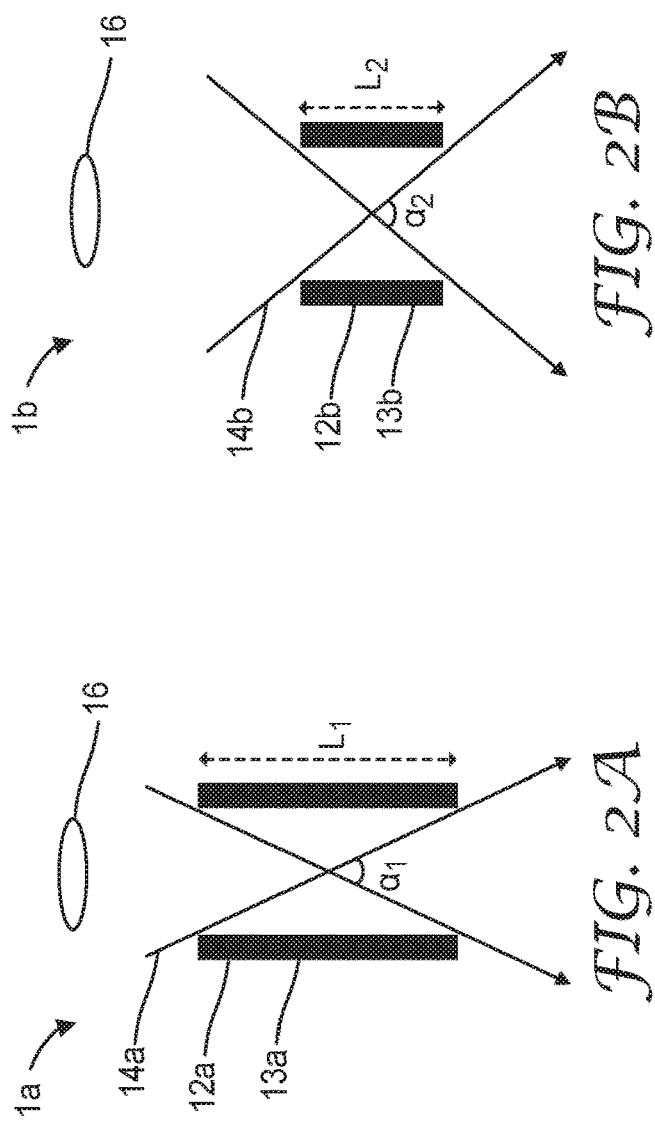
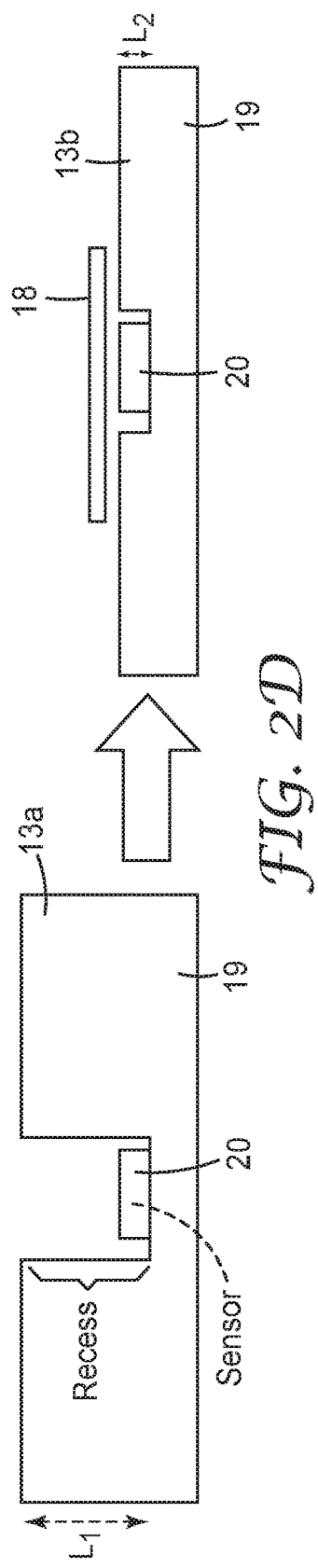

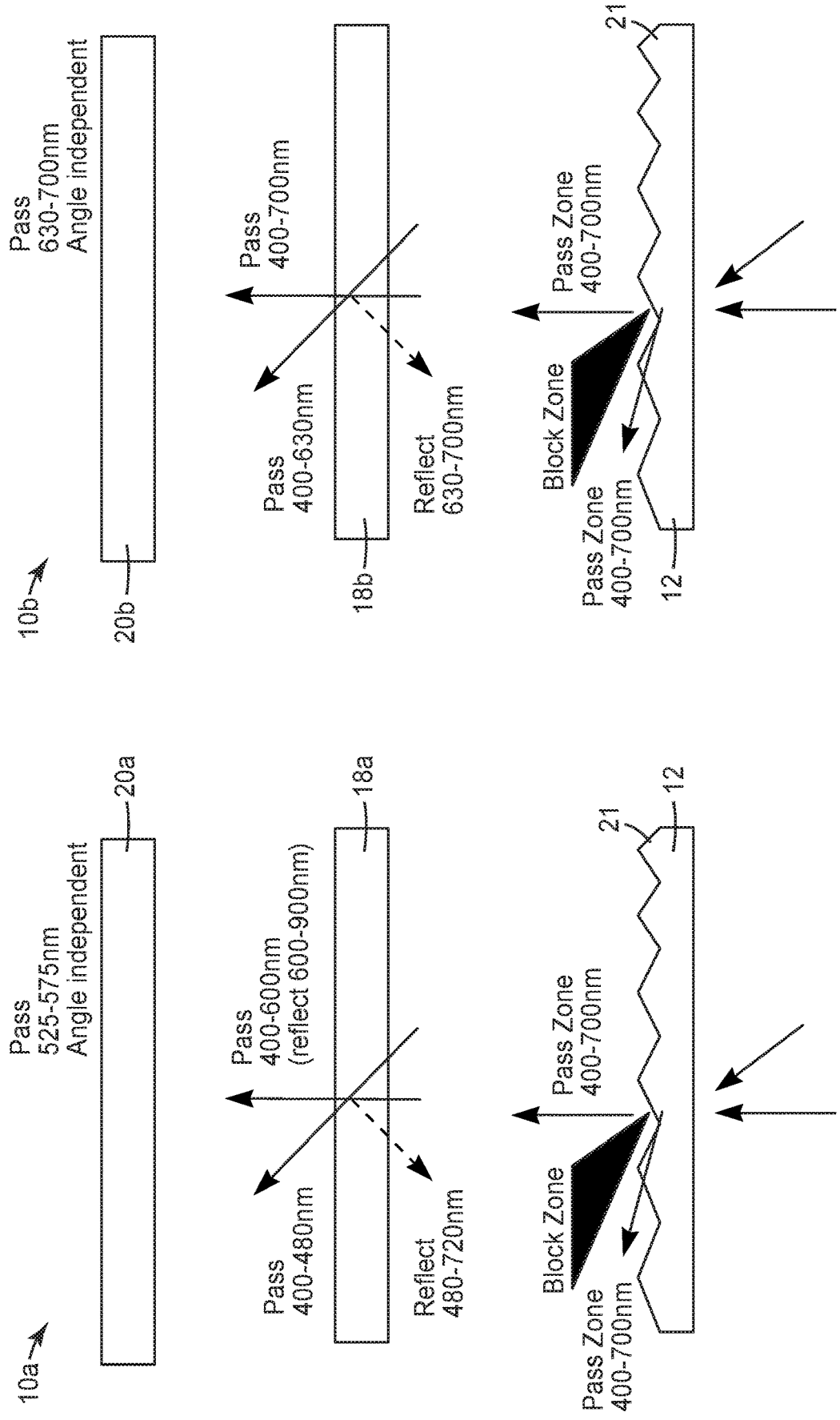

OPTICAL FILTERS COMPLEMENTARY ANGULAR BLOCKING REGIONS

CROSS REFERENCE TO RELATED APPLICATIONS

This application is a national stage filing under 35 U.S.C. 371 of PCT/US2017/057191, filed Oct. 18, 2017, which claims the benefit of U.S. Provisional Application No. 62/409,680, filed Oct. 18, 2016, the disclosure of which is incorporated by reference in its/their entirety herein.

FIELD

The disclosure relates to optical filters and sensors including optical filters. The disclosure is also related to optical filters having complementary angular blocking regions.

BACKGROUND

Optical filters are employed in a wide variety of applications such as optical communication systems, optical sensors, imaging, scientific and industrial optical equipment, and display systems. Optical filters may include optical layers that manage the transmission of incident electromagnetic radiation, including light. Optical filters may reflect or absorb a portion of incident light, and transmit another portion of incident light. Optical layers within an optical filter may differ in wavelength selectivity, optical transmittance, optical clarity, optical haze, and index of refraction.

There are various types of optical sensors that can be used in the above applications including silicon photosensors and also CMOS image sensors. These sensors have a spectral sensitivity function that spans the visible and near infrared, and which is non-uniform over the range. Since an optical sensor has a broad spectral sensitivity function, ambient light sources can create optical noise and interfere with the function of the sensor. Unwanted light could come from a number of ambient sources including the Sun, incandescent, LEDs, OLEDs, etc. In addition to ambient sources causing problems, light sources within an optical system containing the sensor can cause a problem. For example, a pulse oximeter is a device that senses the oxygenation or deoxygenation of the blood. These devices can have two LEDs emitting at two different wavelengths, and two different sensors paired with the respective LEDs. In this case, light from the first LED could interfere with the second sensor, so an optical filter that prevents a sensor from receiving light from the wrong LED could reduce this interference.

SUMMARY

In an example, the disclosure describes an example optical filter including a major surface. The example optical filter has a predetermined light transmission zone comprising angles from 0° to a maximum light transmission angle $\theta_{Tmax}$ relative to a normal axis of the major surface. The example optical filter has a predetermined angular light blocking zone $\theta_B$ comprising angles from $90-\theta_{Tmax}$ to 90°. The example optical filter includes an angle blocking layer having a first angular light blocking range $\theta_{AL}$ relative to the normal axis. The example optical filter includes an interference filter adjacent the angle blocking layer. The interference filter has a second angular light blocking range $\theta_{IF}$ relative to the normal axis. $\theta_B$ is a union of $\theta_{IF}$ and $\theta_{AL}$. $\theta_{IF}$ and $\theta_{AL}$ at least partially overlap.

In an example, the disclosure describes an example optical filter including an interference filter having an incidence angle-dependent reflection band. The example optical filter includes an absorbing layer having an absorption band. The incidence angle-dependent reflection band and the absorption band overlap at at least one wavelength at at least one angle of incidence.

The details of one or more aspects of the invention are set forth in the accompanying drawings and the description below. Other features, objects, and advantages of the invention will be apparent from the description and drawings, and from the claims.

BRIEF DESCRIPTION OF DRAWINGS

The foregoing and other aspects of this invention are made more evident in the following Detailed Description, when read in conjunction with the attached Figures.

FIGS. 1A and 1B are charts illustrating the angular transmission of example angle blocking layers.

FIG. 1C is a conceptual illustration of the band shift of an example interference filter with a change in incidence angle.

FIGS. 2A and 2B are conceptual and schematic lateral cross-sectional views of an example article including a recessed structure.

FIG. 2C is a conceptual and schematic lateral cross-sectional view of an example article including a recessed structure and an interference filter.

FIG. 2D is a conceptual and schematic lateral cross-sectional view of the reduction in thickness of an article including a recessed structure and an interference filter compared to au article including only a recessed structure.

FIGS. 4A and 4B are schematic and conceptual exploded cross-sectional views of example optical filters including an angle blocking layer, an interference filter, and an absorbing layer.

Figure 3A:
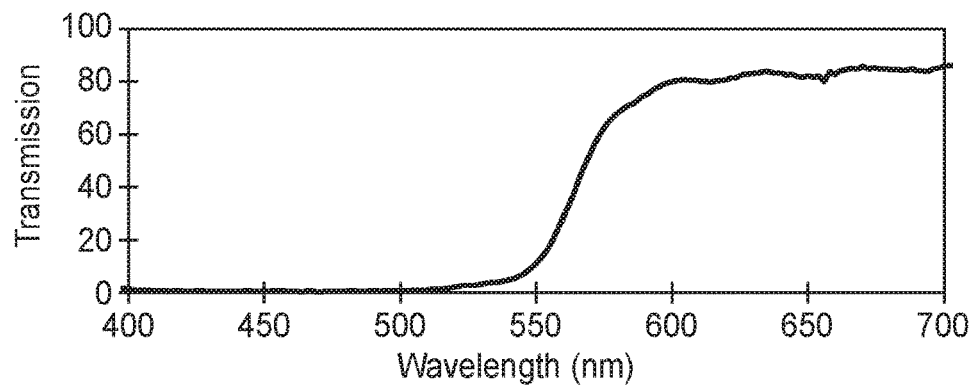
FIGS. 3A, 3B, and 3C are charts illustrating the transmission spectra of example absorbing layers.

It should be understood that features of certain Figures of this disclosure may not necessarily be drawn to scale, and that the Figures present non-exclusive examples of the techniques disclosed herein.

DETAILED DESCRIPTION

Optical filters may be used to change the spectrum of reflected or transmitted light. For example, multilayer optical films (MOFs) may be used in optical fillers. MOFs can be made using multilayer thin film techniques, and, the wavelength range and other optical properties of MOFs may be a function of the range of thicknesses and refractive indices of the layers. Optical filters may also be used to control angles along which light of predetermined wavelengths are transmitted or reflected.

Variations in wavelength of the position of the band edge of a MOF reflecting band, for example, of a MOF interference filter, may lead to visually detectable optical artifacts as the incidence angle or viewing angle is changed. For example, minor caliper variations especially at the angle of transition between the pass and extinction zones of an optical filter including an interference filter may be detectable, detracting, from a visually uniform transition between blocking and transmitting angles.

Such a variation may be mitigated by combining an angle limiting element, for example, a structured surface film. Structured surfaces, for example prismatic films, may achieve sharp transitions from pass to block, but may leak light at other angles which may be on the other side of the block zone. Even prismatic films with a minimal amount of leakage at high angles of incidence may exhibit visible light leakage. Further, prismatic films that have a minimal high angle light emission may require that the transition angle from pass to block be designed farther away from normal incidence than may be desired for a particular application. Additionally, a prismatic film may function best along angles transverse to the axis of the prisms, and not very well along the orthogonal plane. When used alone, prismatic films may exhibit a metallic appearance under certain conditions. Thus, while prismatic films may exhibit relatively sharp transitions from pass to block angles, they may not block a single continuous zone that encompasses high angles.

Combining an interference filter with an angle limiting element in an optical filter may overcome their respective limitations. For example, interference filters may effectively block light transmission at high angles that angle limiting elements may not block, while angle limiting elements may mitigate the band edge variations exhibited by interference filters.

Example optical filters according to the disclosure may limit the angular extent of light from a narrow wavelength source to a detector. In some examples, example optical filters may control the angular intensity distribution of light within a predetermined wavelength band. In some examples, example optical filters may include an interference filter, for example, a MOF interference filter, and an angle limiting element, for example, an angle blocking layer. The angle blocking layer may be refractive or physically block light at predetermined angles by optical phenomena, for example, absorption. The interference filter and the angle blocking layer may have complementary angular blocking regions. For example, the interference filter may block transmission of light in a first range of incidence angles relative to a normal, while the angle blocking layer may block transmission of light in a second range of incidence angles relative to the normal. At least some angles not blocked by one of the interference filter and the angle blocking layer may be blocked by the other of the interference filter and the angle blocking layer. In some examples, at least one angle blocked by the interference filter may also be blocked by the angle blocking layer. In some example, one or both of the first range of angles blocked by the interference filter and the second range of angles blocked by the angle blocking element may depend on the wavelength of light.

The optical properties of angle blocking layers and interference filters for use in example optical filters according to the disclosure are discussed below with reference to FIGS. 1A-1C.

FIGS. 1A and 1B are charts illustrating the angular transmission of example angle blocking layers. FIG. 1A is a chart illustrating the transmission light distribution pattern for an example angle blocking layer including a 3M Optical Lighting Film (3M, Saint Paul, Minn.) including a predetermined prism structure on one side and a smooth surface on the other side. The example angle blocking layer of FIG. 1A has a light emission or transmission zone ABN about the normal, extending to about 30° from the normal, which cuts off beyond about 30° to block light transmission beyond about 35°. The cut-off angle is denoted by the line AB. However, at angles greater than about 60 degrees, light is again transmitted. The range of angles of extinction or blocking are included in the zone ABC, or from about 35° to 60°. Thus, the example angle blocking layer of FIG. 1A exhibits light leakage in the zone CBD.

FIG. 1B is a chart illustrating the transmission light distribution pattern for an example angle blocking layer including a 3M Transmissive Right Angle Film (TRAF) (3M, Saint Paul, Minn.). The example angle blocking layer of FIG. 1B, shows a blocking zone similar to that of FIG. 1A, with light transmission in the A1B1N zone, followed by blocking in the C1B1A1 zone, followed by high angle light leakage in the D1B1C1 zone.

As discussed with reference to example optical articles, interference filters may be used to block light leakage exhibited by angle blocking layers, for example, light leakage at high angles.

FIG. 1C is a conceptual illustration of the band shift exhibited by an example interference filter with a change in incidence angle. Interference filters may be spectrally selective, having a transmissive wavelength range and a reflective (or blocking) wavelength range. The transition between these two ranges is a "band edge". The reflective band will shift to shorter wavelengths as the incidence angle of light changes from normal to oblique. This property of interference filters may be used to limit the angular range of light of predetermined wavelengths emitting from a source or being received by a sensor. At normal incidence, a band edge of a reflection band in the transmission spectrum of interference filter is at a longer wavelength than a predetermined communication wavelength, but close enough so that it will eclipse the communication wavelength at an intended oblique angle of incidence. For example, the interference filter may have a band edge positioned from 10-100 nm higher than the LED communication wavelength at normal incidence. At oblique incidence angles, the reflection band shifts to shorter wavelengths and blocks the communication wavelength. The result is a conical reception angle.

Example optical articles according to the disclosure may utilizing such angle shifting of the interference filter in combination with the angle blocking zones of angle selective elements, with each blocking complementary angular zones.

Example optical articles according to the disclosure may be used to arrive at a thinner system that blocks an angular range that normally would have required a thicker system. For example, as described with reference to FIGS. 2A and 2B, angle limiting elements based on recesses where physical walls geometrically limit the angle of transmission may be used.

FIGS. 2A and 2B are conceptual and schematic lateral cross-sectional views of an example article including a recessed structure wall. Example article 1a shown in FIG. 2A includes an angle blocking layer 12a having a recessed structure wall 13a having a characteristic dimension L1. Recessed structure wall 13a may be a wall of a recessed structure having a polygonal, circular, ellipsoidal, or other cross section, for example, a recessed cylindrical walled structure. Recessed structure wall 13a allows transmission of an incident light 14a from a source 16 within a transmission angle of $\alpha_1$, and physically or optically blocks light beyond the transmission angle $\alpha_1$. Source 16 may include light sources such as guided or ambient light, sunlight, LEDs, lasers, incandescent light, fluorescent lights, compact fluorescent lights, or other direct or indirect sources of light. The magnitude of the transmission angle $\alpha_1$ is related to the characteristic dimension $L_1$. When $L_1$ is lowered, au increases. For example, example article 1b shown in FIG. 2B includes an angle blocking layer 12b having a recessed wall 13b having a characteristic dimension $L_2$ that is lesser than $L_1$. Consequently, a transmission angle $\alpha_2$ exhibited by example article 1b is wider than $\alpha_1$. Therefore, for achieving a relatively narrower transmission angle, for example, $\alpha_1$, a relatively higher characteristic dimension of the recessed structure wall, for example, $L_1$ of recessed structure wall 13a, may be required. However, increasing the characteristic dimensions of recessed structures will lead to an increase in the thickness of article 1a, which may not be desirable.

FIG. 2C is a conceptual and schematic lateral cross-sectional view of an example article 10 including the angle blocking layer 12b having the recessed structure wall 13b and an interference filter 18. The recessed structure wall 13b having the shorter characteristic dimension $L_2$ (compared to $L_1$ of recessed structure wall 13a) blocks higher light angles (beyond $\alpha_2$), while interference filter 18 blocks lower transmission angles (for example, between ($\alpha_1$ and $\alpha_2$, effectively narrowing the transmission angle to $\alpha_1$. Thus, example article 10 may be as thin as article 1b, while providing the narrower transmission angle $\alpha_1$ associated with the thicker article 1a, instead of the wider transmission angle $\alpha_2$ associated with article 1b.

FIG. 2D is a conceptual and schematic lateral cross-sectional view of the reduction in thickness of an article including the recessed structure wall 13b having lower characteristic dimension $L_2$ and the interference filter 18. In contrast, an article including only the recessed structure wall 13a has the higher characteristic dimension $L_1$, for achieving similar transmission angles of light to a sensor 20 on a substrate 19.

In some examples, example optical filters may include a spectrally selective absorber having a complementary wavelength blocking range to the interference filter. For example, wavelengths that are not blocked by one of the spectrally selective absorber and the interference filter may be blocked by the other of the interference filter and the spectrally selective absorber. Spectrally selective absorbers may include dyed PET films, or "gel filters" which may have sharp absorption spectra.

Figure 3B:
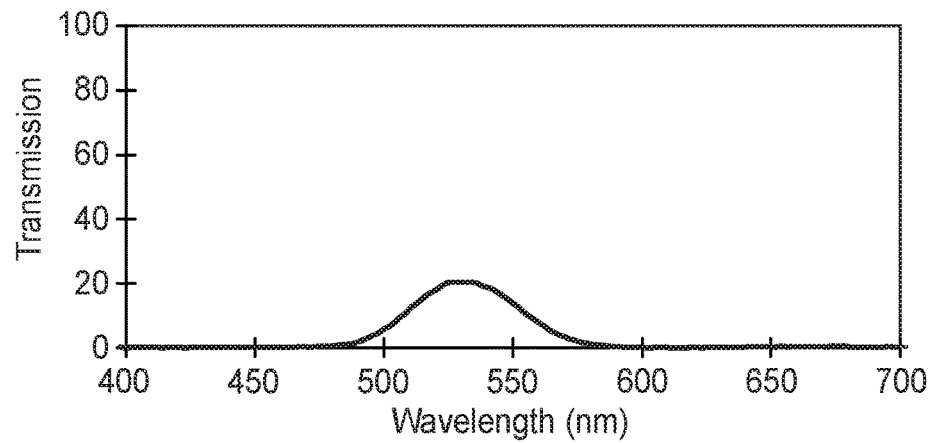
Figure 3C:
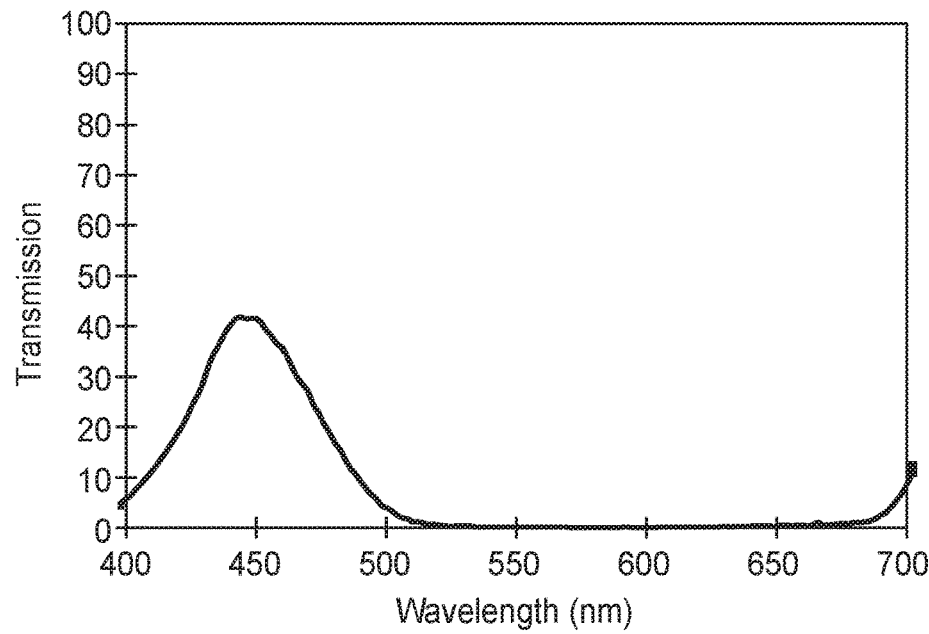

FIGS. 3A, 3B, and 3C are charts illustrating the transmission spectra of example absorbing layers. FIG. 3A is a chart illustrating the transmission spectrum of an example absorbing layer including a red dyed PET film. The film exhibits a spectrally sham cut-off, between 500 and 600 nm. FIG. 3B is a chart illustrating the transmission spectrum of an example absorbing layer including a dark yellow green dyed PET film. FIG. 3C is a chart illustrating the transmission spectrum of an example absorbing layer including a blue dyed PET film. The films of FIGS. 3B and 3C exhibit a spectral leak, which can vary from 20-60% in transmission intensity and can be positioned at different wavelength in the visible spectrum.

Example optical filters according to the disclosure may optionally include an absorbing layer, in addition to an interference filter and an angle blocking layer, as described with reference to the example optical filters of FIGS. 4A and 4B. FIGS. 4A and 4B are schematic and conceptual exploded cross-sectional views of example optical filters including an angle blocking layer, an interference filter, and an absorbing layer.

Example optical filter 10a of FIG. 4A includes an angle blocking layer 12 and an interference filter 18a for selectively transmitting light from source 16. Angle blocking layer 12 may include angle limiting or selective elements or other angle limiting features, for example, a plurality of angle limiting features 21 including one or more of recessed walls, prisms, Fresnel structures, Fresnel rings, recesses, louvers, channels, or microreplicated features. In some examples, the louvers may include faces that are normal, or substantially perpendicular, to a major surface of angle blocking layer 12. The plurality of angle limiting features 21 may include one or more of substantially uniform features, symmetric features, asymmetric features, lines or grooves of features, or arrays of features. In some examples, angle blocking layer 12 may include plurality of angle limiting features 21 disposed on a refractive substrate. For example, the refractive substrate may include a turning film, a brightness enhancing film, or a microstructure optical film. In some examples, plurality of angle limiting features 21 may include a first subplurality of angle limiting features that limit light angles in a first plane, and a second subplurality of angle limiting features that limit light angles in a second plane. For example, the second plane may be orthogonal to the first plane. In some examples, the first and second subpluralities of angle limiting features may effectively act to restrict light within asymmetric light distributions, for example, an elliptical light pattern. In some examples, angle blocking layer 12 may include a prismatic film, as shown in FIG. 4A. Angle blocking layer 12 may exhibit a transmission zone centered about normal incidence, and an off-axis block zone, followed by a high angle transmission zone, for example, as described with reference to FIGS. 1A and 1B. In the transmission zones, all visible wavelengths may be transmitted.

In some examples, interference filter 18a may include a MOF, for example, a birefringent MOF. In some examples, interference filter 18a may include an isotropic film, for example 3M Condor Film (3M, Saint Paul, Minn.), or a film formed by vapor deposition or sputtering. In some examples, the MOF may act as a colored mirror, reflecting selected wavelengths, and transmitting selected wavelengths. In some examples, interference filter 18a may reflect light in a 600-900 nm band at normal incidence, which shifts to shorter wavelengths off-axis or at oblique angles, for example, as discussed with reference to FIG. 1C. For example, band edge positions may shift to about 80% of their normal incidence value at an angle of about 60 degrees.

In some examples, optical filter 10a may optionally include an absorbing layer 20a. In some examples, absorbing layer 20a may include a spectrally selective absorber. In some examples, as shown in FIG. 4A, interference filter 18a may be disposed between absorbing layer 20a and angle blocking layer 12. In some examples, absorbing layer 20a may only allow transmission of a predetermined wavelength band, for example, transmission of 525-575 nm, and absorb or otherwise block other wavelengths. In some examples, the transmission band of absorbing layer 20 may not be angularly shifting or otherwise angle-dependent. For example, the only light in the transmission band that reaches absorbing layer 20a may be within a limited cone angle centered around normal incidence, and the only light emitted from absorbing layer 20a may be green (or another predetermined color associated with a predetermined wavelength band), and of a limited angular extent. Light outside this wavelength range is absorbed.

In some examples, optical filter 10a may operate across a predetermined wavelength band, for example, including visible wavelengths (for example, between about 400 and about 700 nm), ultraviolet wavelengths (for example, less than about 400 nm), and infrared and near-infrared wavelengths (for example, between about 700 and about 2000 nm).

The optical properties of optical filter 10a may be tuned by changing the properties of one or both of interference filter 18a, and absorbing layer 20a, without needing to change angle blocking layer 12. For example, optical filter 10b of FIG. 4B includes the angle blocking layer 12 and an interference filter 18b. Interference filter 18b may pass light in a 400-700 nm band at normal incidence, pass light in a 400-630 nm at an oblique angle, and reflect light in a 630-700 nm band at oblique angles. Absorbing layer 20b may pass light in a angle-independent band of 630-700 nm. Thus, while example optical filter 10a of FIG. 4A may be a green transmitting stack, example optical filter 10b of FIG. 4B may be a red transmitting stack. Thus, optical properties of example optical filters according to the disclosure may be changed without having to remanufacture or procure new batches of angle blocking layers 12, that may be expensive, by instead relatively inexpensively changing interference filters or absorbing layers.

Figure 4C:
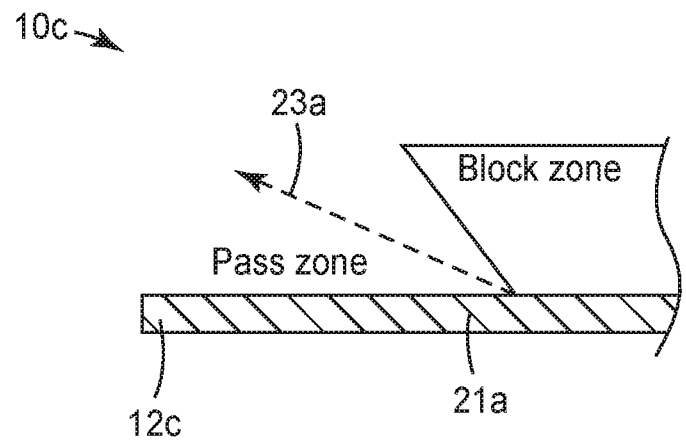
FIG. 4C is a schematic and conceptual exploded cross-sectional view of an example optical filter including an angle blocking layer, and having an inclined pass zone.

In some examples, the pass zone may be defined about an axis normal or substantially perpendicular to a major surface of an optical article, for example, as shown in FIGS. 4A and 4B. However, in other examples, the pass zone may be defined about a non-perpendicular axis, for example, an inclined axis between about 1 degrees and less than about 90 degrees. FIG. 4C is a schematic and conceptual exploded cross-sectional view of an example optical filter 10c including an angle blocking layer 12a, and having an inclined pass zone. For example, the pass zone may be defined about an inclined axis 23a, as shown in FIG. 4C. Angle blocking layer 12a may include a plurality of angle limiting features 21a configured to define an inclined pass zone, for example, an inclined pass or transmission cone. In some examples, the plurality of angle limiting features 21a may include features described with respect to the plurality of angle limiting features 21 of FIG. 4A. In some examples, the plurality of angle limiting features 21a may include louvers that are non-perpendicular, inclined, or tilted so that the transmission or pass zone is defined about inclined axis 23a, as shown in FIG. 4C.

Figure 4D:
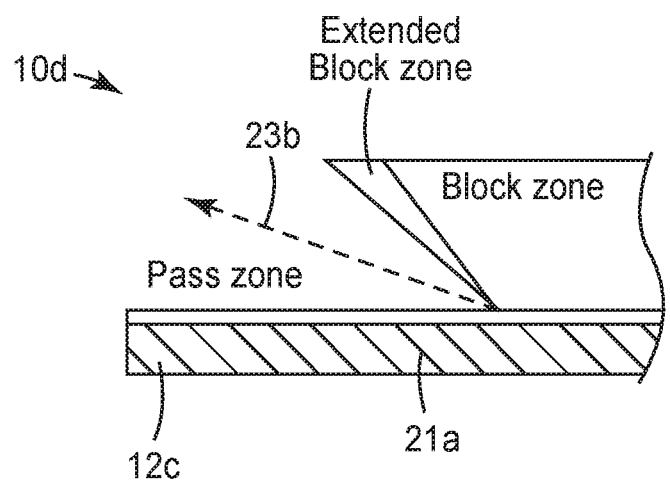
FIG. 4D is a schematic and conceptual exploded cross-sectional view of an example optical filter including an angle blocking layer, and an interference filter, and having an inclined pass zone defined by an extended block zone.

FIG. 4D is a schematic and conceptual exploded cross-sectional view of an example optical filter 10d including angle blocking layer 12c, and interference filter 18a, and having an inclined pass zone defined by an extended block zone, about an inclined axis 23b. The extended block zone includes a block zone resulting from interference filter 18a, in addition to the block zone resulting from the plurality of angle limiting features 21, for example, including tilted louvers similar to those in FIG. 5c.

Figure 5A:
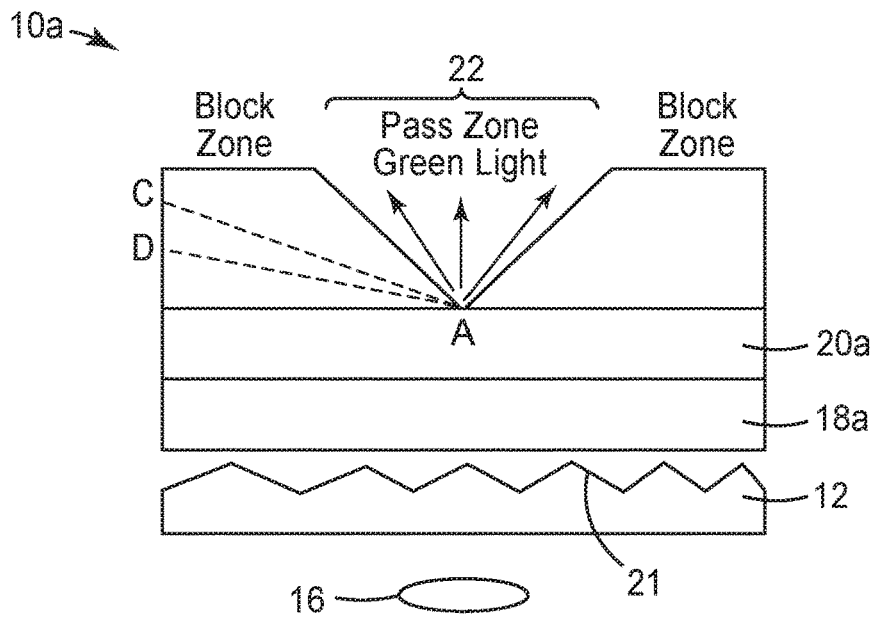
FIG. 5A is a schematic and conceptual illustration of the angular transmission and blocking by the example optical filter of 4A.
Figure 5B:
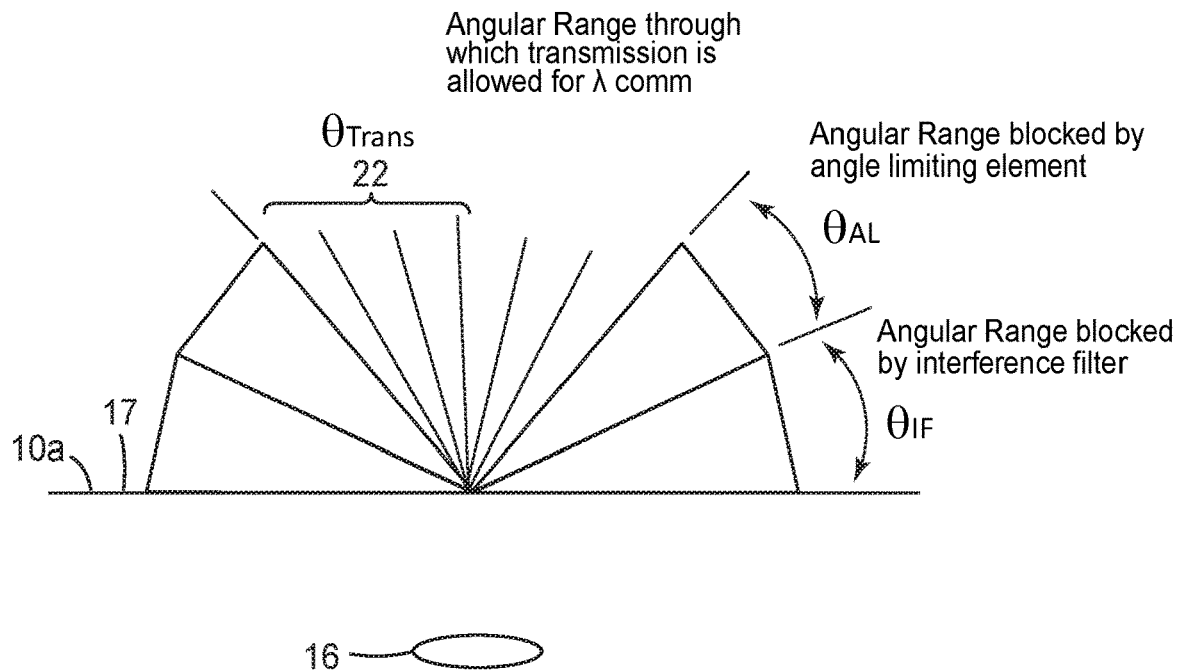
FIG. 5B is a schematic and conceptual illustration of the angular transmission and blocking by the example optical filter of FIG. 5A.

The optical transmission and blocking, properties of optical filter 10a of FIG. 4A may be understood with reference to FIG. 5A. FIG. 5A is a schematic and conceptual illustration of the angular transmission and blocking of light from source 16 by example optical filter 10a of 4A. The light distribution pattern is shown at the top portion of the figure. There is a central zone, or pass zone 22, where green light is transmitted. Line AB denotes a transition angle from pass to block which is provided for by angle blocking layer 12. Line AC denotes the angle at which the reflecting band of interference filter 18a has shifted sufficiently to (combined with the absorbing layer 20a), block light. Line AD denotes the angle at which angle blocking layer 12 begins to transmit light again, which is then blocked by the combination of interference filter 18a and absorber layer 20a. The angular zone denoted by DAB may provide a buffer zone for interference filter 18a (including areas having manufacturing caliper variations) to shift into position that may not be visually detectable. This buffer zone may thus prevent perception of a non-uniformity arising from interference filter 18a as the band edge encroaches into the transmission zone. FIG. 5B is a schematic and conceptual illustration of the angular transmission and blocking by optical filter 10a of FIG. 5A. Or is the angular range blocked by interference filter 18a. $\theta_{AL}$ is the angular range blocked by angle blocking layer 12. $\theta_{Trans}$ is the half-angle angular transmission range, relative to a normal axis to a major surface of optical filter 10a. Thus, pass zone 22 extends about the normal axis, in a cone defined by the half-angle $\theta_{Trans}$. Half-angle $\theta_{Trans}$ may extend to a maximum transmission angle $\theta_{Tmax}$ relative to the normal axis of a major surface 17 of optical filter 10a.

Figure 5C:
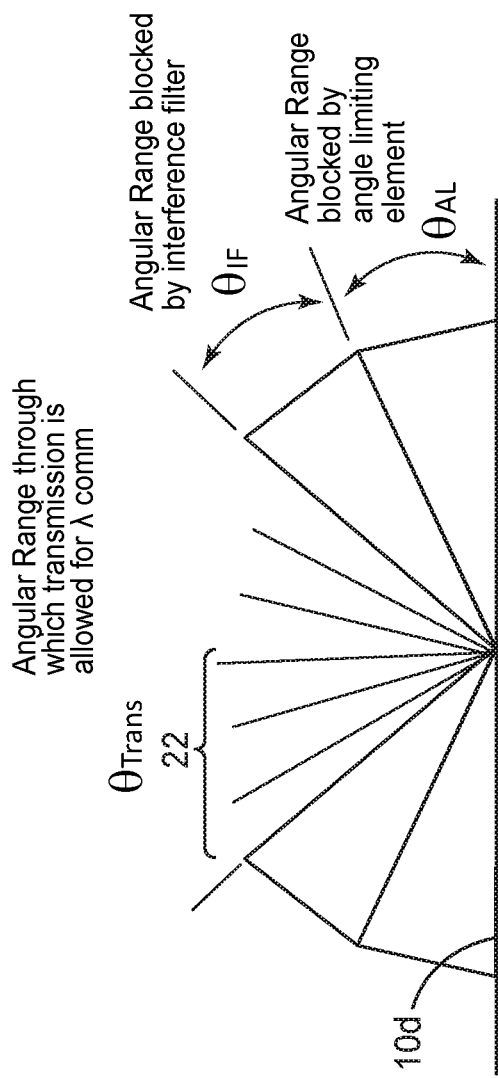
FIG. 5C is a schematic and conceptual illustration of the angular transmission and blocking by an example optical filter.

While optical filter 10a includes angle blocking layer 12 between interference filter 18a and source 16, in some examples, interference filter 18a may face source 16, and angle blocking layer 12 may be disposed away from source 16. FIG. 5C is a schematic and conceptual illustration of the angular transmission and blocking by an example optical filter 10d in which interference filter 18a faces source 16.

In some examples, optical filter 10a includes major surface 17. Optical filter 10a may have a predetermined light transmission zone comprising angles from 0° to a maximum light transmission angle $\theta_{Tmax}$ relative to a normal axis of major surface 17. Optical filter 10a may have a predetermined angular light blocking zone $\theta_B$ including angles from 90−$\theta_{Tmax}$ to 90°. In some examples, optical filter 10a includes angle blocking layer 12 having a first angular light blocking range $\theta_{AL}$ relative to the normal axis. In some examples, optical filler 10a includes interference filter 18a adjacent angle blocking layer 12. The interference filter may have a second angular light blocking range $\theta_{IF}$ relative to the normal axis. $\theta_B$ is a union of $\theta_{IF}$ and $\theta_{AL}$. For example, $\theta_B$ includes all angles that belong to either $\theta_{IF}$ or $\theta_{AL}$. In some examples, $\theta_{IF}$ and $\theta_{AL}$ at least partially overlap. For example, at least one angle or a range of angles may belong to both $\theta_{IF}$ and $\theta_{AL}$. In some examples, at least one angle in $\theta_{AL}$ is greater than one angle in $\theta_{IF}$. In some examples, at least one angle in $\theta_{IF}$ is greater than one angle in $\theta_{AL}$. In some examples, one or both of $\theta_{IF}$ and $\theta_{AL}$ are wavelength-dependent. For example, at least one angle in one or both of $\theta_{IF}$ and $\theta_{AL}$ may increase or decrease when the wavelength of incident light increases or decreases. In some examples, interference filter 18a may include one or both of a birefringent multilayer optical film or an isotropic film. In some examples, angle blocking layer 12 may include a plurality of angle limiting features 21. In some examples, the plurality of angle limiting features 21 includes one or more of prisms, Fresnel structures, Fresnel rings, recesses, louvers, channels, or microreplicated features.

In some examples, the plurality of angle limiting features 21 may have a characteristic dimension, and $\theta_{AL}$ may have a predetermined relationship with the characteristic dimension. For example, $\theta_{AL}$ may narrow when the characteristic dimension increases, and broaden when the characteristic dimension decreases. For example, $\theta_{AL}$ may be narrower when the characteristic dimension is smaller. In some examples, angle blocking layer 12 may include one or both of a turning film or a brightness enhancing film. In some examples, angle blocking layer 12 may have a predetermined light leakage angular transmission zone. In some examples, interference filter 18a may have a characteristic transmission spectrum comprising a reflection band, wherein the reflection band has a band edge that shifts lower when an angle of incidence is reduced. In some examples, the reflection band of interference filter 18a may include a wavelength transmitted through a predetermined light leakage angular transmission zone of angle blocking layer 12.

In some examples, optical filter 18a may include a wavelength selective or spectrally selective absorber. In some examples, the spectrally selective absorber may include a dye or a pigment that absorbs predetermined wavelengths. In some examples, interference filter 18a may include the wavelength selective absorber. In some examples, angle blocking layer 12 includes the wavelength selective absorber.

In some examples, optical filter 18a may include absorbing layer 20a including the wavelength selective absorber. In some examples, absorbing layer 20a may be between interference filter 18a and angle blocking layer 12. In some examples, interference filter 18a may be between absorbing layer 20a and angle blocking layer 12. In some examples, angle blocking layer 12 may be between the absorbing layer and the interference filter.

Figure 6A:
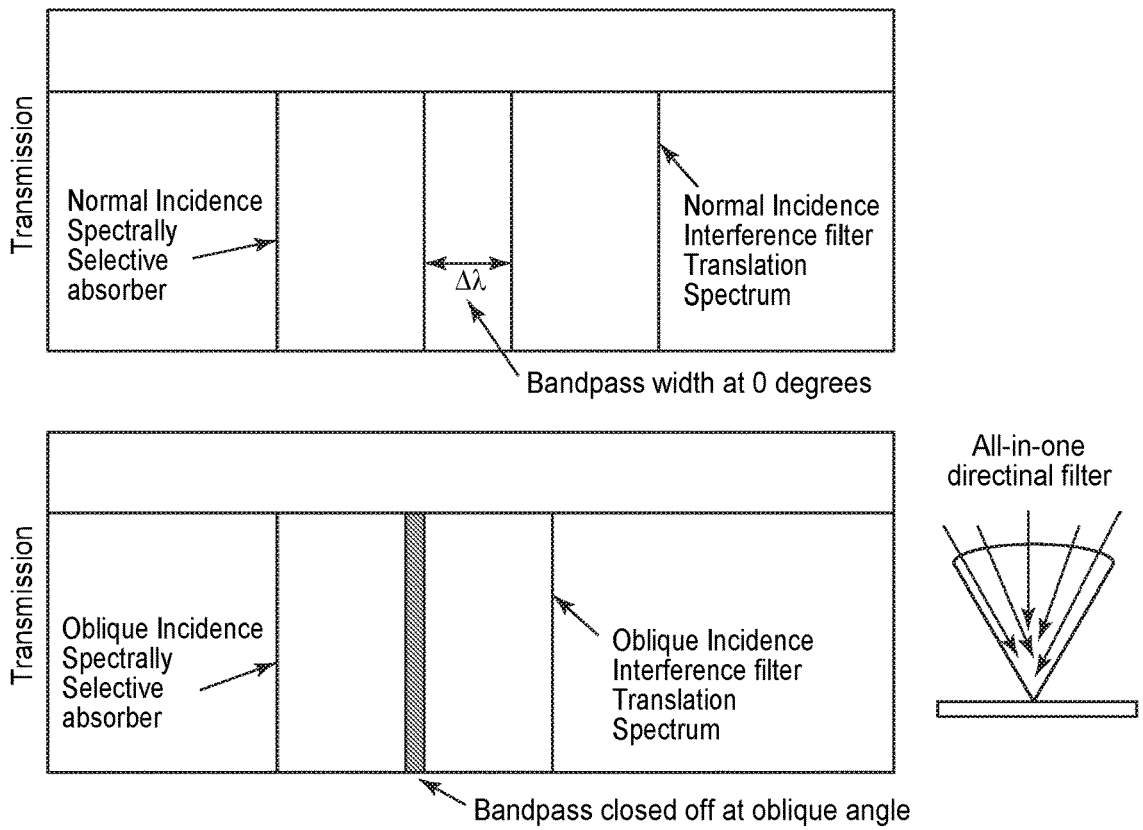
FIG. 6A is a conceptual illustration of the band shift with a change in incidence angle of an example optical including an interference filler and an absorbing layer.
Figure 6B:
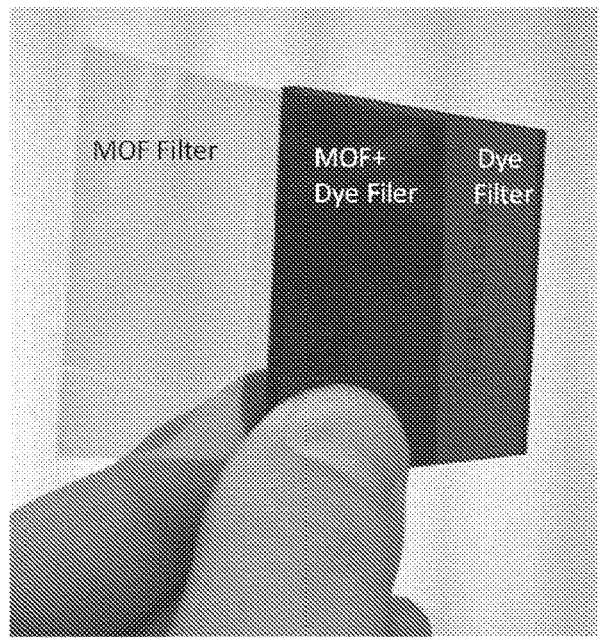
FIG. 6B is a photograph comparing light transmission and blocking by a multilayer optical film interference filter, a dye filler, and an article including a combination of the multilayer optical film interference filter and the dye filter.

In some examples, optical filter 10a may not include a separate angle blocking layer 12, and may instead include interference filter 18a and absorbing layer 20a. FIG. 6A is a conceptual illustration of the band shift with a change in incidence angle of an example optical including an interference filter and an absorbing layer. As shown in FIG. 6A, a transmissive bandpass between an absorbing band of absorbing layer 20a and a reflection band of interference filter 18a may have a width $\Delta\lambda$ at normal incidence. As the angle of incidence increases, one or both of the respective bands may shift, for example, a downshift of the reflection band of interference filter 18a, eventually closing the band gap. FIG. 6B is a photograph comparing light transmission and blocking by an interference filter including a MOF, an absorbing layer including a dye, and an article including a combination of the interference filter and the absorbing layer. As shown in FIG. 6B, the combination substantially blocks the transmission of light, even though the absorbing layer and the interference filter individually transmit at least some light.

Figure 7A:
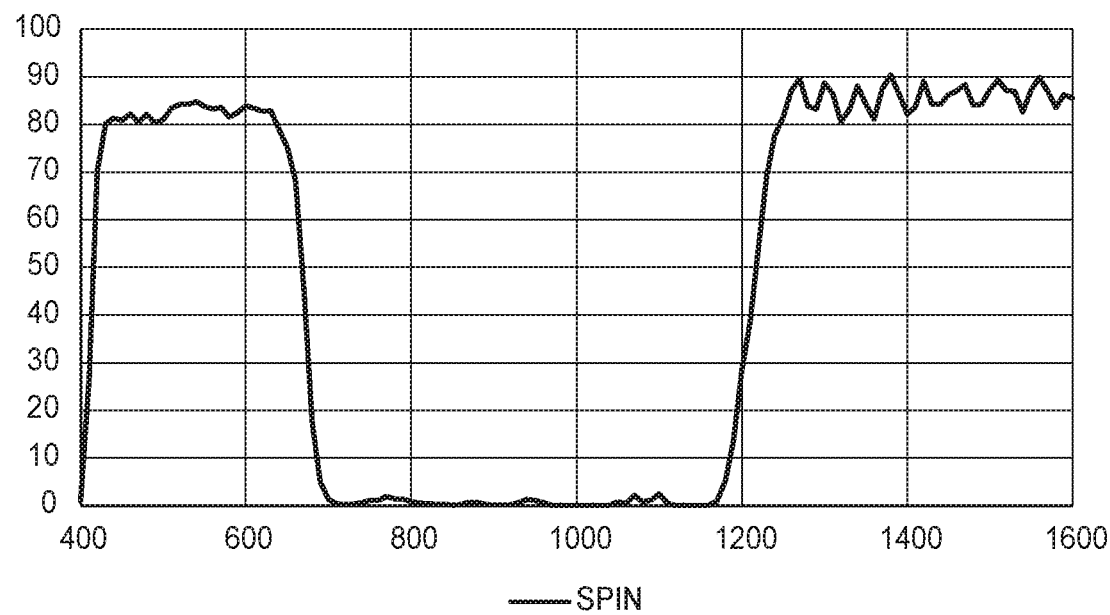
FIG. 7A is a chart illustrating the transmission spectrum of the example multilayer optical film interference filter of FIG. 6B.
Figure 7B:
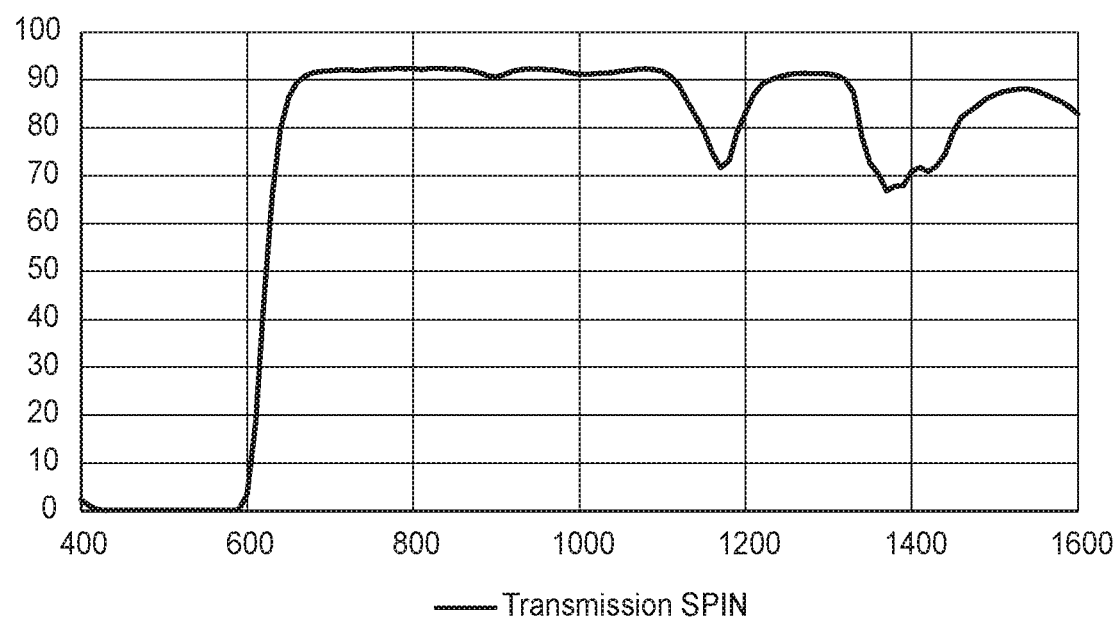
FIG. 7B is a chart illustrating the transmission spectrum of the absorbing layer of FIG. 6B.
Figure 7C:
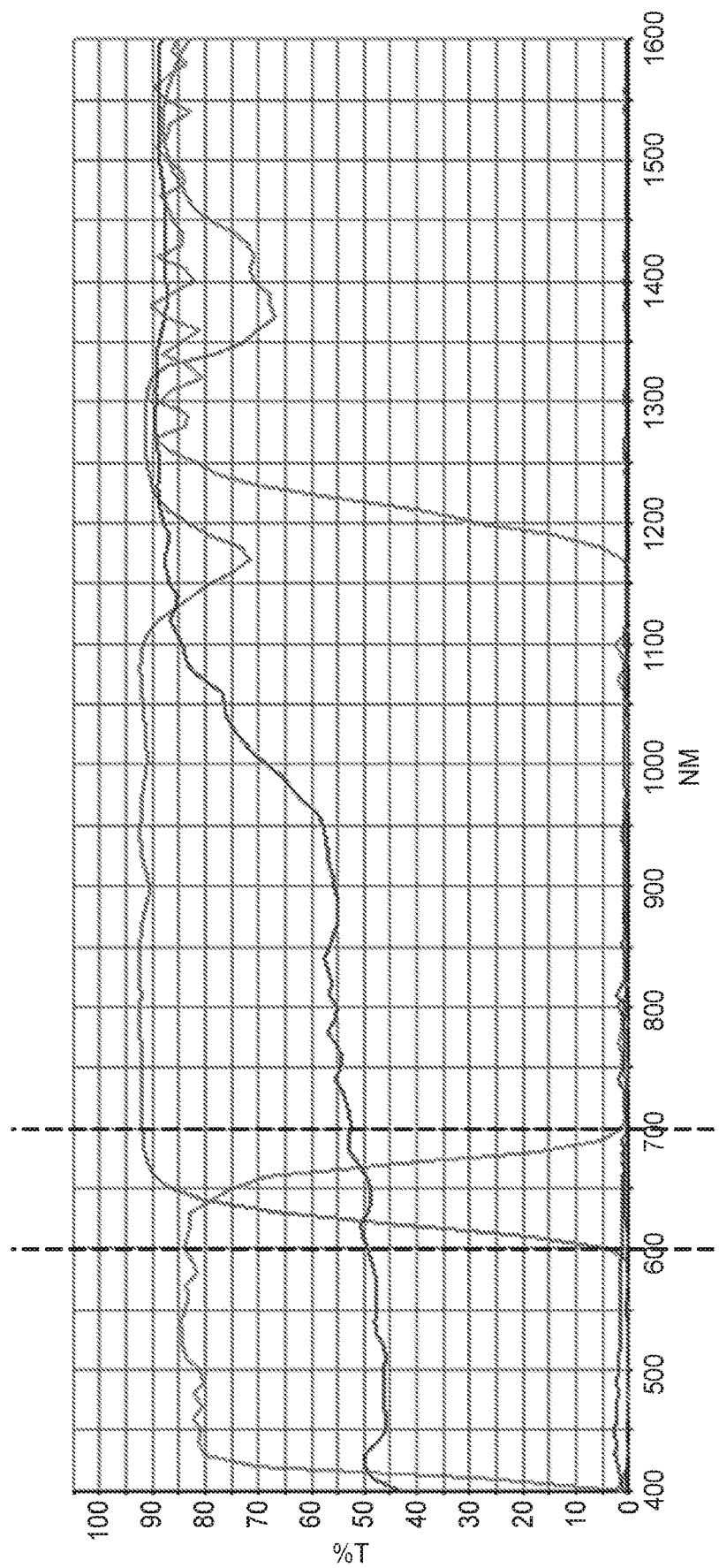
FIG. 7C is a chart illustrating the transmission spectrum of an example optical filter including, the interference filter of FIG. 7A and the absorbing layer of FIG. 7B.
Figure 8A:
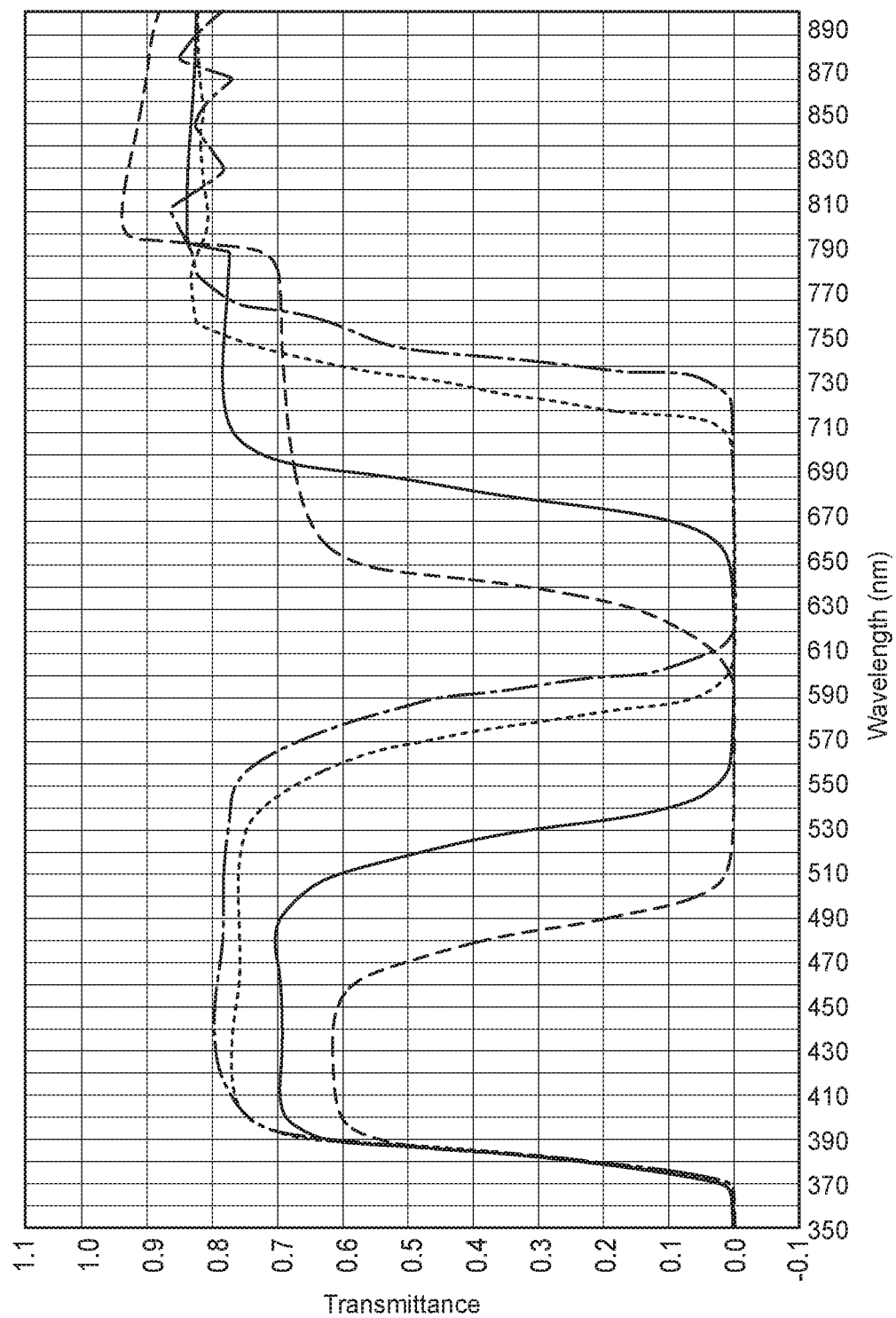
FIG. 8A is a chart illustrating the transmission spectrum of an example multilayer optical film interference filter.
Figure 8B:
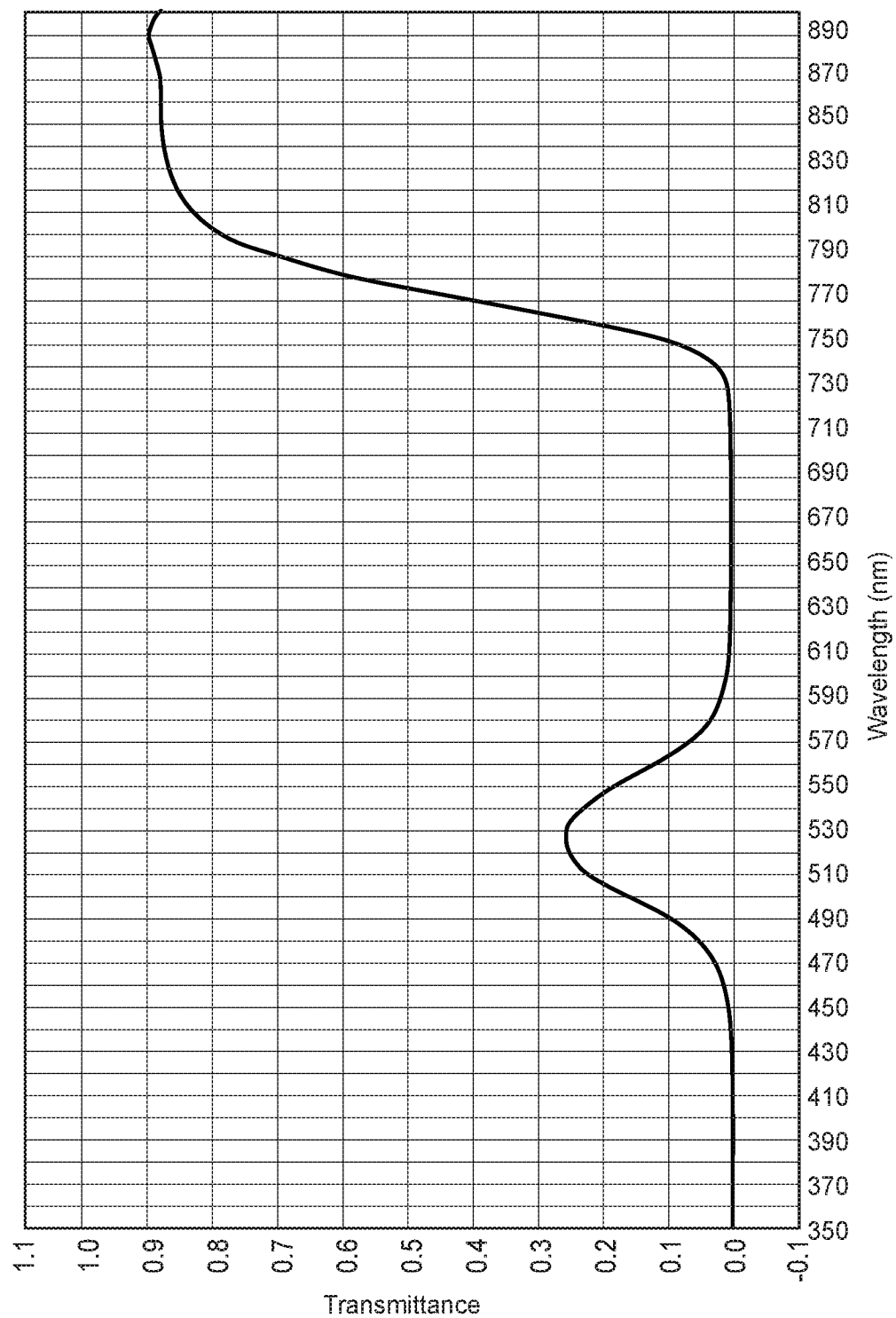
FIG. 8B is a chart illustrating the transmission spectrum of an example absorbing layer.
Figure 8C:
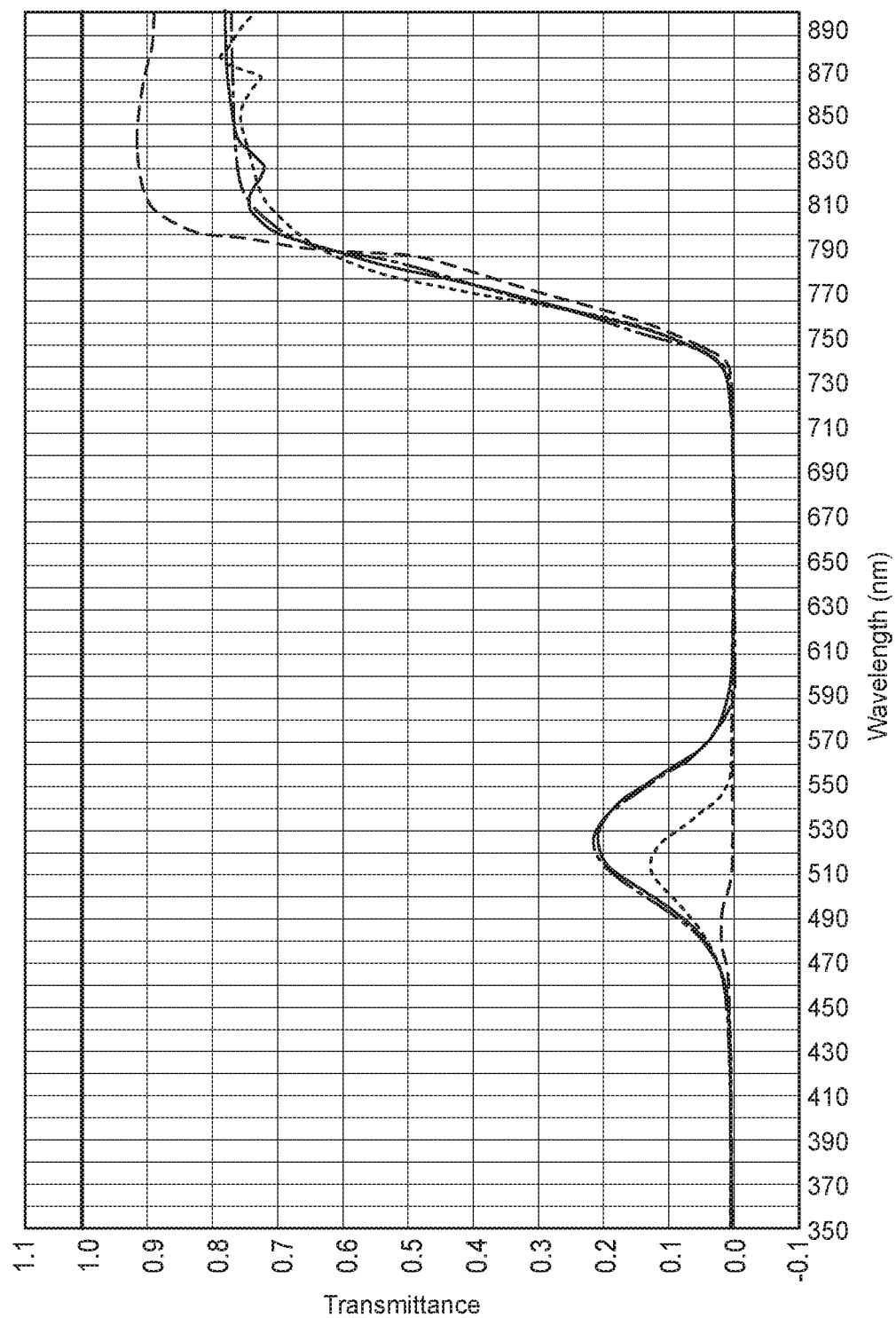
FIG. 8C is a chart illustrating the transmission spectrum of an example optical filter including the interference filler of FIG. 8A and the absorbing layer of FIG. 8B.

The spectral properties of the example article of FIG. 6B may be understood with reference to FIGS. 7A-7C. FIG. 7A is a chart illustrating the transmission spectrum of the example multilayer optical film interference filter of FIG. 6B. FIG. 7B is a chart illustrating the transmission spectrum of the absorbing layer of FIG. 6B. FIG. 7C is a chart illustrating the transmission spectrum of an example optical filter including the interference filter of FIG. 7A and the absorbing layer of FIG. 7B. As shown in FIG. 7C, combining the interference filter and the absorbing layer results in a notch filter at normal incidence at about 640 nm. As another example, FIGS. 8A-8C illustrate the spectral properties of an example green angle selective optical filter. FIG. 8A is a chart illustrating the transmission spectrum of an example multilayer optical film interference filter, at different angles, showing the angle shift. FIG. 8B is a chart illustrating the transmission spectrum of an example absorbing layer. FIG. 8C is a chart illustrating the transmission spectrum of an example optical filter including the interference filter of FIG. 8A and the absorbing layer of FIG. 8B. As shown in FIG. 8C, combining the interference filter of FIG. 8A and the absorbing layer of FIG. 8B results in transmission of green at normal incidence, and extinction of green at oblique angles.

In some examples, angle blocking layer 12 may include both a plurality of angle blocking features and a spectrally selective absorber. In some examples, angle blocking layer 12 may include only one of the plurality of angle limiting features or the spectrally selective absorber. For example, absorbing layer 20a may replace angle blocking layer 12.

In some examples, optical filter 18a may include interference filter 12 having an incidence angle-dependent reflection band, and absorbing layer 20a having an absorption band, wherein the incidence angle-dependent reflection band and the absorption band overlap at at least one wavelength at at least one angle of incidence. In some examples, interference filter 10a may have a characteristic transmission spectrum including the incidence angle-dependent reflection band. For example, the angle-dependent reflection band may have a band edge that shifts lower when an angle of incidence is reduced. In some examples, the angle-dependent reflection band of interference filter 18a includes a wavelength transmitted by absorbing layer 20a. In some examples, interference filter 18a may include a wavelength selective absorber. In some examples, absorbing layer 18a may include a wavelength selective absorber.

Figure 9:
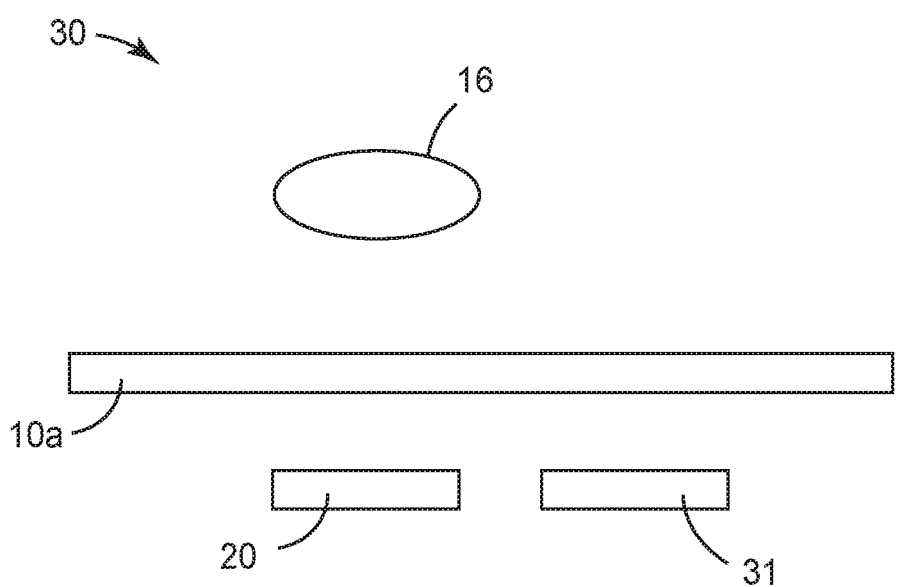
FIG. 9 is a schematic and conceptual diagram illustrating an example system including an optical filter, a source, a sensor, and a reflector.

Example optical filters according to the disclosure may be used in systems where it is desirable to limit angles of light. FIG. 9 is a schematic and conceptual diagram illustrating an example system 30 including optical filter 10a, source 16, sensor 20, and a reflector 31. While in some examples, system 30 may include all of source 16, sensor 20, and reflector 31, as shown in FIG. 9, in other examples, system 30 may include only one or two of source 16, sensor 20, or reflector 31.

While system 30 may include one or more of optical filter 10a, source 16, or sensor 20, in some examples, system 30 may include any optical filter, source, or sensor according to the disclosure. For example, system 30 may include one or more of a narrow wavelength light source, a visible source, an ultraviolet source, or a near infrared or infrared source, an LED, a laser, or other suitable wavelength sources. In some examples, the source may exhibit a spectral spike of FWHM<40 nm. A particular system for sensing and communications may include a specific communication wavelength. For example, the source may include a mono wavelength LED such as a green, red, or near IR LED that can have emission around 20 nm full width half max. In some examples, system 30 may include more than one type of LED emitting at more than one wavelength.

System 30 may include one or more of a visible light sensor, ultraviolet sensor, near infrared or infrared sensor, a broadband sensor, a narrowband sensor, LIDAR sensor, CMOS sensor, proximity sensor, gesture sensor, camera sensor, an image sensor, a CCD sensor, a time of flight sensor, an iris scanner, or other sensors.

In some examples, system 30 may include sensor 20 and optical filter 10a. Optical filter 10a may limit the angle of light received by sensor 20. For example, optical filter 10a may block light from noise sources that may transmit light at angles beyond a pass or transmission zone. In some examples, system 30 may include sensor 20, optical filter 10a, and source 16.

In some examples, system 30 may include reflector 31. Reflector 31 may define one or more of a specular reflecting surface, a diffuse reflecting surface, or a retroreflective surface. For example, reflector 31 may include a reflective layer, or a reflecting body or object. While in the example configuration of system 30 shown in FIG. 9, reflector 31 is disposed adjacent sensor 20 and opposite source 16, in other examples, reflector 31 may be located at any suitable location. For example, sensor 20 and source may both be disposed opposite reflector 31 across optical filter 10a, so that reflector 31 reflects light from source 16 to sensor 20. In some examples, system 30 may not include sensor 20, and reflector 31 may reflect light from source 16 across optical filter 10a. In some examples, system 30 may include neither reflector 31 and optical filter 10a, and reflector 31 may reflect ambient light across optical filter 10a.

In some examples, system 30 may include source 16 and optical filter 10a. In some examples, system 30 may limit the emission angle emitted by source 16 for privacy or for ergonomic reasons. For example, system 30 may reduce glare directed towards a car driver from a stop light or a brake light. Example optical articles, for example, optical filter 10a, may be used in example systems 30, for example, including vehicle display systems where interior glare control is needed, as a privacy feature for displays such as automatic teller machines, as a traffic control film for traffic signals, or in a center high mounted stop lamp (CHIMSL).

Thus, example optical filters according to the disclosure may be used to achieve light distribution patterns that have sham transitions from a color (such as red or green) to black as a function of angle, and which can maintain extinction of light even at high angles of incidence and all azimuthal angles. Such light distribution patterns may not be possible using only structured surfaces or other articles. Example optical filters according to the disclosure may exhibit one or more of the following properties: 1) a single continuous pass zone and a single continuous block zone for light of predetermined wavelengths; 2) a conical transmission pattern of predetermined cone angle; 3) extinction or blocking at high angles of incidence; 4) a sharp transition from the pass to the block zone; 5) uniformity in appearance over a large area even at the transition angle; 6) No to low shift in perceived hue over the transition from pass to block; 7) good performance in a plane transverse to the prism axis. Example optical filters according to the disclosure may be prepared by combining existing commercial products to tune optical properties, leading to reduced manufacturing cost.

Various examples of the invention have been described. These and other examples are within the scope of the following claims.

The invention claimed is:
1. An optical filter comprising:
a major surface, wherein the optical filter has a predetermined light transmission zone comprising angles from 0° to a maximum light transmission angle $\theta_{Tmax}$ relative to a normal axis of the major surface, wherein the optical filter has a predetermined angular light blocking zone $\theta_B$ comprising angles from 90−$\theta_{Tmax}$ to 90°;
an angle blocking layer having a first angular light blocking range $\theta_{AL}$ relative to the normal axis, wherein the first angular light blocking range θAL has an upper limit less than 90°, wherein the angle blocking layer has a predetermined light leakage angular transmission zone, and wherein the predetermined light leakage angular transmission zone extends from the upper limit of the first angular light blocking range θAL to 90°; and
an interference filter adjacent the angle blocking layer, wherein the interference filter has a second angular light blocking range $\theta_{IF}$ relative to the normal axis, wherein $\theta_B$ is a union of $\theta_{IF}$ and $\theta_{AL}$, wherein $\theta_{IF}$ and $\theta_{AL}$ at least partially overlap, and wherein the predetermined light leakage angular transmission zone of the angle blocking layer is covered by the second angular light blocking range $\theta_{IF}$ of the interference filter.

2. The optical filter of claim 1, wherein at least one angle in $\theta_{AL}$ is greater than one angle in $\theta_{IF}$.

3. The optical filter of claim 1, wherein at least one angle in $\theta_{IF}$ is greater than one angle in $\theta_{AL}$.

4. The optical filter of claim 1, wherein one or both of $\theta_{IF}$ and $\theta_{AL}$ are wavelength-dependent.

5. The optical filter of claim 1, wherein the interference filter comprises one or both of a birefringent multilayer optical film or an isotropic film.

6. The optical filter of claim 1, wherein the angle blocking layer comprises a plurality of angle limiting features.

7. The optical filter of claim 6, wherein the plurality of angle limiting features comprises one or more of prisms, Fresnel structures, Fresnel rings, recesses, louvers, channels, or microreplicated features.

8. The optical filter of claim 6, wherein the plurality of angle limiting features has a characteristic dimension, and wherein $\theta_{AL}$ has a predetermined relationship with the characteristic dimension.

9. The optical filter of claim 6, wherein the angle blocking layer comprises one or both of a turning film or a brightness enhancing film.

10. The optical filter of claim 1, wherein the interference filter has a characteristic transmission spectrum comprising a reflection band, wherein the reflection band has a band edge that shifts to lower wavelengths when an angle of incidence is reduced.

11. The optical filter of claim 1, further comprising a wavelength selective absorber.

* * * * *

UNITED STATES PATENT AND TRADEMARK OFFICE
CERTIFICATE OF CORRECTION

PATENT NO. : 11,366,257 B2
APPLICATION NO. : 16/341639
DATED : June 21, 2022
INVENTOR(S) : John Allen Wheatley It is certified that error appears in the above-identified patent and that said Letters Patent is hereby corrected as shown below:

In the Claims

Column 12
Line 21 and 26, In Claim 1, delete "θAL" and insert -- $\theta_{AL}$ --, therefor.

Signed and Sealed this
Twenty-fourth Day of January, 2023

*Katherine Kelly Vidal*

Katherine Kelly Vidal
*Director of the United States Patent and Trademark Office*